(12) United States Patent
Cui et al.

(10) Patent No.: US 12,135,411 B2
(45) Date of Patent: Nov. 5, 2024

(54) SYSTEMS AND METHODS FOR CONFOCAL MICROSCOPY

(71) Applicant: Purdue Research Foundation, West Lafayette, IN (US)

(72) Inventors: Meng Cui, West Lafayette, IN (US); Hehai Jiang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 266 days.

(21) Appl. No.: 17/885,728

(22) Filed: Aug. 11, 2022

(65) Prior Publication Data

US 2023/0273417 A1 Aug. 31, 2023

Related U.S. Application Data

(60) Provisional application No. 63/314,160, filed on Feb. 25, 2022.

(51) Int. Cl.
*G02B 21/00* (2006.01)
*G02B 13/00* (2006.01)
(Continued)

(52) U.S. Cl.
CPC ..... *G02B 21/0032* (2013.01); *G02B 13/0095* (2013.01); *G02B 13/22* (2013.01);
(Continued)

(58) Field of Classification Search
CPC .... G02B 21/00; G02B 21/02; G02B 21/0032; G02B 21/0076; G02B 21/0036; G02B 21/008; G02B 21/0072; G02B 21/0048; G02B 21/006; G02B 13/00; G02B 13/22; G02B 13/0095; G02B 27/14; G02B 27/10; G02B 27/141; G02B 27/1013
See application file for complete search history.

(56) References Cited

U.S. PATENT DOCUMENTS 3,013,467 A 12/1961 Marvin
6,188,514 B1 * 2/2001 Saito ................ G02B 21/0052
359/381

(Continued)

OTHER PUBLICATIONS

Baumgart, E. et al.: "Scanned light sheet microscopy with confocal slit detection", 21805-21814, Sep. 3, 2012, Retrieved from the Internet on Jun. 24, 2024 from URL: https://doi.org/10.1364/OE.20.021805.
(Continued)

*Primary Examiner* — Jurie Yun
(74) *Attorney, Agent, or Firm* — Purdue Research Foundation

(57) ABSTRACT

A confocal microscope system includes a light source configured to form a light beam, a scanning unit, and an objective lens. The scanning unit is in the form of a mechanically driven scanning unit with a controllable scanning trajectory, and is configured to direct the light beam through the scanning trajectory. The objective lens defines a pupil plane and a focal plane. The light beam is directed from the scanning unit to the objective lens. The confocal microscope system is configured for multi-color line-scanning confocal microscopy, and implements multi-color fluorescence imaging without laser excitation crosstalk.

20 Claims, 9 Drawing Sheets

(51) Int. Cl.
| | |
|---|---|
| *G02B 13/22* | (2006.01) |
| *G02B 21/02* | (2006.01) |
| *G02B 27/10* | (2006.01) |
| *G02B 27/14* | (2006.01) |

(52) U.S. Cl.
CPC ..... *G02B 21/0036* (2013.01); *G02B 21/0072* (2013.01); *G02B 21/0076* (2013.01); *G02B 21/008* (2013.01); *G02B 21/02* (2013.01); *G02B 27/1013* (2013.01); *G02B 27/141* (2013.01)

(56) References Cited

U.S. PATENT DOCUMENTS

| | | | | |
|---|---|---|---|---|
| 6,388,788 | B1* | 5/2002 | Harris | G02B 21/0028 359/368 |
| 10,684,456 | B2* | 6/2020 | Miyazono | G02B 21/025 |

OTHER PUBLICATIONS

Fahrbach, F. O. et al.: "Propagation stability of self-reconstructing Bessel beams enables contrast-enhanced imaging in thick media", 632, Apr. 3, 2012, Retrieved from the Internet on Jun. 24, 2024 from URL: https://doi.org/10.1038/ncomms1646.

Silvestri, L. et al.: "Confocal light sheet microscopy: micron-scale neuroanatomy of the entire mouse brain", 20582-20598, Sep. 3, 2012, Retrieved from the Internet on Jun. 24, 2024 from URL: https://doi.org/10.1364/OE.20.020582.

Mei, E. et al.: "A line scanning confocal fluorescent microscope using a CMOS rolling shutter as an adjustable aperture", 269-276, Jul. 3, 2012, Retrieved from the Internet on Jun. 24, 2024 from URL: https://doi.org/10.1111/j.1365-2818.2012.03642.x.

Medeiros, G. et al.: "Confocal multiview light-sheet microscopy", 8881, Dec. 1, 2015, Retrieved from the Internet on Jun. 24, 2024 from URL: https://doi.org/10.1038/ncomms9881.

Krzic, U. et al.: "Multiview light-sheet microscope for rapid in toto imaging", 730-733, Aug. 3, 2012, Retrieved from the Internet on Jun. 24, 2024 from URL: https://doi.org/10.1038/nmeth.2064.

Qin, S. et al.: "Doubling the resolution of a confocal spinning-disk microscope using image scanning microscopy", 164-181, Jan. 1, 2021, Retrieved from the Internet on Jun. 24, 2024 from URL: https://doi.org/10.1038/s41596-020-00408-x.

Schulz, O. et al.: "Resolution doubling in fluorescence microscopy with confocal spinning-disk image scanning microscopy", 21000-21005, Dec. 24, 2013, Retrieved from the Internet on Jun. 24, 2024 from URL: https://doi.org/10.1073/pnas.1315858110.

Pawley, J. B.: "Handbook of Biological Confocal Microscopy", 221-237, Jan. 1, 2006, Retrieved from the Internet on Jun. 24, 2024 from URL: https://link.springer.com/referenceworkentry/10.1007/978-1-4614-5431-1_12.

Nakano, A.: "Spinning-disk confocal microscopy-a cutting-edge tool for imaging of membrane traffic", 349-355, Aug. 3, 2002, Retrieved from the Internet on Jun. 24, 2024 from URL: https://doi.org/10.1247/csf.27.349.

Xu, F. et al.: "High-throughput mapping of a whole rhesus monkey brain at micrometer resolution", 1521-1528, Dec. 1, 2021, Retrieved from the Internet on Jun. 24, 2024 from URL: https://doi.org/10.1038/s41587-021-00986-5.

Ragan, T. et al.: "Serial two-photon tomography for automated ex vivo mouse brain imaging", 255-258, Mar. 1, 2012, Retrieved from the Internet on Jun. 24, 2024 from URL: https://doi.org/10.1038/nmeth.1854.

Niedworok, C.J. et al.: "Charting monosynaptic connectivity maps by two-color light-sheet fluorescence microscopy", 1375-1386, Oct. 3, 2012, Retrieved from the Internet on Jun. 24, 2024 from URL: https://doi.org/10.1016/j.celrep.2012.10.008.

Seiriki, K. et al.: "Whole-brain block-face serial microscopy tomography at subcellular resolution using FAST", 1509-1529, Jun. 3, 2019, Retrieved from the Internet on Jun. 24, 2024 from URL: https://doi.org/10.1038/s41596-019-0148-4.

Chakraborty, T. et al.: "Light-sheet microscopy of cleared tissues with isotropic, subcellular resolution", 1109-1113, Dec. 3, 2019, Retrieved from the Internet on Jun. 24, 2024 from URL: https://doi.org/10.1038/s41592-019-0615-4.

Bouchard, M. et al.: "Swept confocally-aligned planar excitation (SCAPE) microscopy for high-speed volumetric imaging of behaving organisms", 113-119, Feb. 3, 2015, Retrieved from the Internet on Jun. 24, 2024 from URL: https://doi.org/10.1038/nphoton.2014.323.

Wassie, A.T. et al.: "Expansion microscopy: principles and uses in biological research", 33-41, Jan. 3, 2019, Retrieved from the Internet on Jun. 24, 2024 from URL: https://doi.org/10.1038/s41592-018-0219-4.

Zhong, Q. et al.: "High-definition imaging using line-illumination modulation microscopy", 309-315, Mar. 1, 2021, Retrieved from the Internet on Jun. 24, 2024 from URL: https://doi.org/10.1038/s41592-021-01074-x.

Conchello, J.A. et al.: "Optical sectioning microscopy", 920-931, Dec. 3, 2005, Retrieved from the Internet on Jun. 24, 2024 from URL: https://doi.org/10.1038/nmeth815.

Power, R. M. et al.: "A guide to light-sheet fluorescence microscopy for multiscale imaging", 360, Apr. 3, 2017, Retrieved from the Internet on Jun. 24, 2024 from URL: https://doi.org/10.1038/nmeth.4224.

* cited by examiner

SYSTEMS AND METHODS FOR CONFOCAL MICROSCOPY

CROSS-REFERENCE TO RELATED APPLICATIONS

This application is related to and claims the priority benefit of U.S. Provisional Patent Application No. 63/314,160, entitled "Systems and Methods for Confocal Microscopy," filed Feb. 25, 2022, the contents of which are hereby incorporated by reference in their entirety into the present disclosure.

GOVERNMENT SUPPORT CLAUSE

This invention was made with government support under EY032382, MH120005, MH124611 and NS107689 awarded by the National Institutes of Health. The government has certain rights in the invention.

TECHNICAL FIELD

The present application relates to optical systems and methods, and specifically to confocal microscopy and related optical systems using high throughput scientific complementary metal-oxide-semiconductor (sCMOS) cameras that are configured for multi-line scanning.

BACKGROUND

This section introduces aspects that may help facilitate a better understanding of the disclosure. Accordingly, these statements are to be read in this light and are not to be understood as admissions about what is or is not prior art.

Confocal microscopy improves on standard fluorescence microscopy by using pinholes to reject out-of-focus light, which typically results in greater resolution, greater contrast, reduced background, and reduced noise. However, the pinhole only images a small area of a sample and therefore needs to be scanned across the whole sample, which takes time and can cause photo damage. This format is known as laser scanning confocal microscopy (LSCM).

Spinning disk confocal microscopy (SDCM) represents an alternative to LSCM. Rather than a single pinhole, a SDCM can have hundreds of pinholes arranged in spirals on an opaque disk which rotates at high speeds. As the disk is spun, the pinholes scan across the sample in rows and build an image. Using a spinning disk vastly improves the speed of image acquisition by allowing for the imaging of fast dynamic processes and live specimens. It can also reduce photo damage relative to LCSM methods. As such, spinning disk confocal microscopy has emerged as an important tool for 3D imaging of biological samples.

However, existing spinning disk microscope systems typically fail to take advantage of the modern high-speed, larger frame, rolling shutter CMOS cameras. For multi-color imaging, the multi-color laser excitation also generates inevitable noise crosstalk in spinning disk confocal imaging. Accordingly, the inventors of the present disclosure have endeavored to improve upon the systems and methods utilized for high-throughput multi-color confocal microscopy.

SUMMARY

Aspects of this disclosure describe systems and methods which can achieve high-throughput confocal microscopy. The presented system can implement multi-color fluorescence imaging without laser excitation crosstalk. Certain aspects teach systems and methods for multi-color line-scanning confocal microscopy. Using aspects of the described systems and methods, improved confocal microscopes can include combinations including one or more of optimal scan lens designs configured for coherent line excitations, automatic system drift corrections, small-angle near focal plane color splitting, camera trigger jitter correction, dual-axis astigmatism control, tilted line-based automatic scanner calibration, and individual scanners for each color to eliminate excitation noise crosstalk.

Specifically, the present disclosure includes aspects which can include a light source configured to form a light beam, a scanning unit in the form of a mechanically driven scanning unit with a controllable scanning trajectory, and an objective lens defining a pupil plane and a focal plane. The scanning unit can be configured to direct the light beam through the scanning trajectory, and the light beam can be directed from the scanning unit to the objective lens through a pair of relay lenses and a first cylindrical lens. The pair of relay lenses can be configured to relay the light beam from an output of the scanning unit onto the focal plane of the objective lens. The first cylindrical lens can define a focal length, and the first cylindrical lens can be positioned to receive the light beam from the pair of relay lenses. In some embodiments, the distance of the first cylindrical lens from the pupil plane of the objective lens can be equal to the focal length of the first cylindrical lens. In other embodiments, each of the pair of relay lenses can be a spherical telecentric lens, and can collectively form a 4f relay of the light beam between the scanning unit and the objective lens.

In certain aspects of the described embodiments, the system can include an astigmatism adjustment module. In some embodiments, the astigmatism adjustment module can include a spherical concave lens, a second cylindrical lens, and a spherical convex lens. The position of the second cylindrical lens can be selectively moveable between the spherical convex lens and the spherical concave lens. Movement of the second cylindrical lens in a first direction toward the spherical concave lens can be operable to reduce an astigmatism effect on the light beam by the second cylindrical lens, and movement of the second cylindrical lens in a second direction toward the convex lens can be operable to increase the astigmatism effect on the light beam by the second cylindrical lens. In other embodiments, the astigmatism adjustment module can include a spherical concave lens, a second cylindrical lens, and a third cylindrical lens. The second cylindrical lens can define a first separation distance from the spherical concave lens and the third cylindrical lens can define a second separation distance from the spherical concave lens, where the first and second separation distances can each be selectively adjustable.

In additional aspects of the described embodiments, the system can include at least one sCMOS camera that can be configured to receive a fluorescence light output transmitted away from the objective lens. The sCMOS camera can further be operable to output a line clock signal, and the scanning unit can be configured to synchronize the controllable scanning trajectory with the line clock signal.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
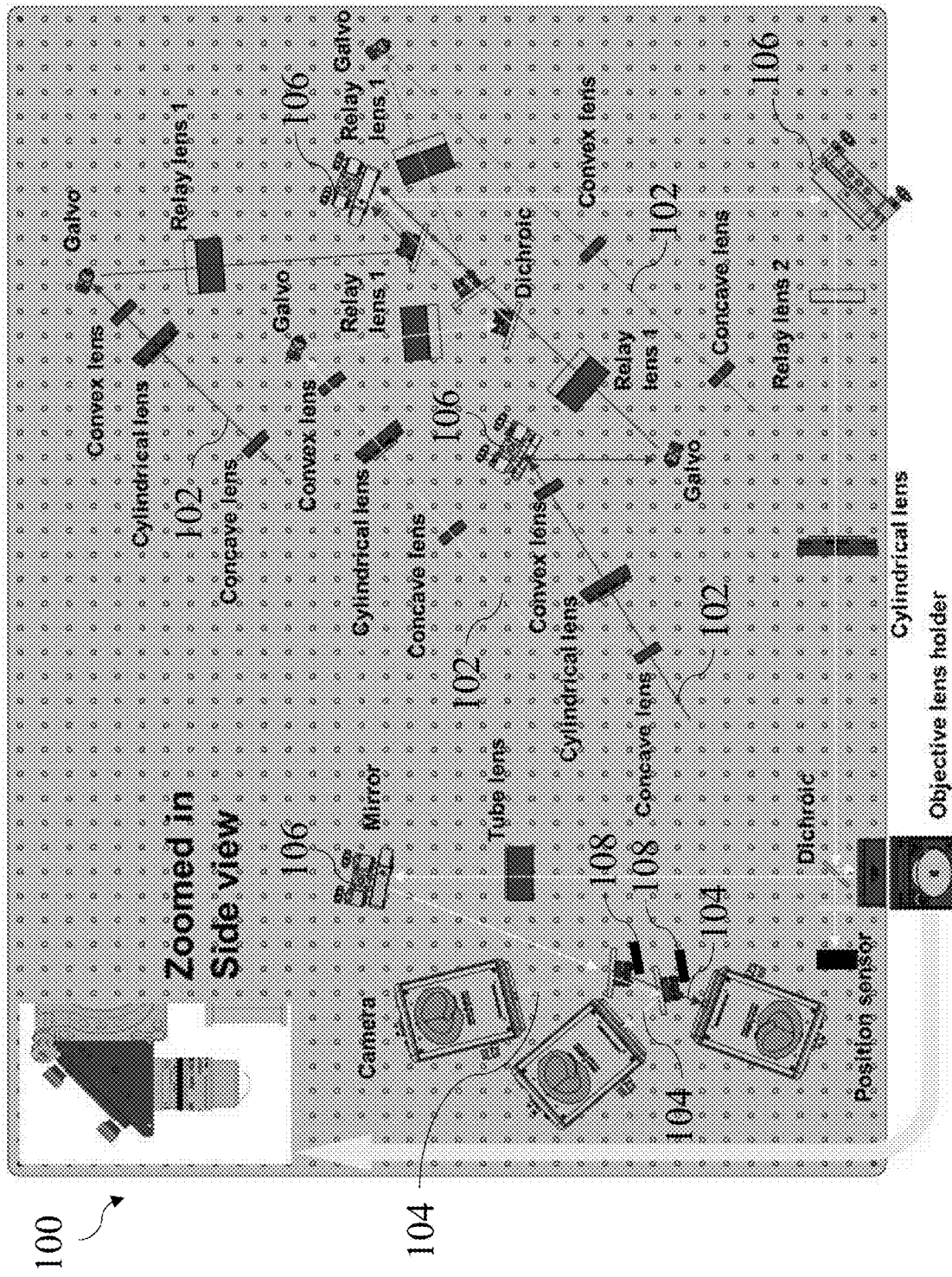
FIG. 1 depicts a schematic of one exemplary system configured for multicolor line confocal microscopy.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Shown in FIG. 1 is one exemplary imaging system (100) which includes various example laser excitation lines (102) (also referred to herein as "laser beams"), fluorescence detection channels (104), lenses (see, FIG. 1), dichroic beam splitters (see, FIG. 1) (also referred to herein and on FIG. 1 as "dichroics"), mirrors (106), and galvanometer scanners (see, FIG. 1) (also referred to herein and on FIG. 1 as "galvos" or "galvo scanners"). Each laser excitation line (102) is configured to be scanned by its own galvo scanner (see, FIG. 1). Thereafter, the scanned laser beams are combined by dichroic beam splitters (see, FIG. 1) which may be positioned near the focal plane following the relay lens 1 (see, FIG. 1) associated with each laser excitation line (102), respectively. These dichroic beam splitters (see, FIG. 1) may be utilized at shallow incidence light angles for the reflected beams. As such, the dichroic beam splitter can transmit focused optical beams with minimized astigmatism. With the reduced beam area on the dichroic beam splitter surface, the optical aberration due to the flatness of the dichroic beam splitter is suppressed. Therefore, by incorporating the aspects described, the laser excitation beams (102) and the fluorescence emission beams (104) encounter minimal aberration from the dichroic beam splitters (see, FIG. 1).

The galvo scanning may be precisely synchronized with each camera's line clock such that the excitation line location matches precisely with the detection line location. The camera line exposure time can be increased from equal to the line readout time to a few times of that value which increases the signal exposure time and signal strength, which can come at the cost of reduced out-of-focus signal rejection. In some embodiments, the exposure time is set to twice the line readout time.

Figure 2A:
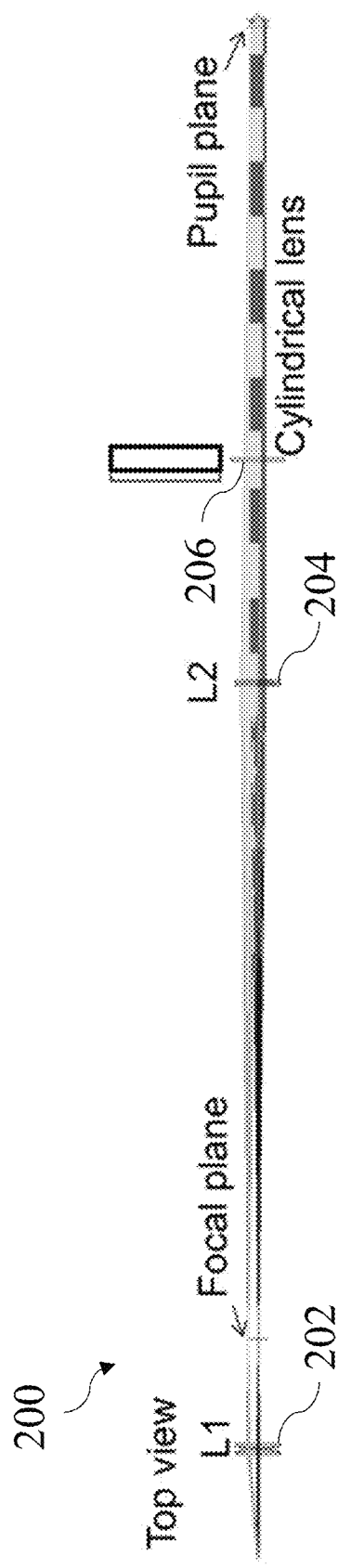
FIG. 2A depicts a top view of a schematic of one scan lens configuration for the system of FIG. 1.
Figure 2B:
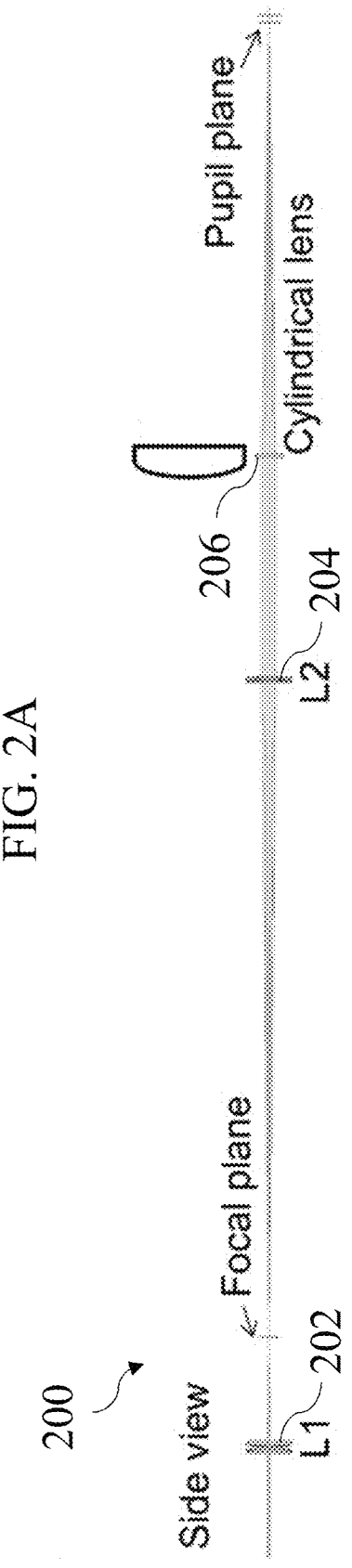
FIG. 2B depicts a side view of the scan lens configuration of FIG. 2A.

For large field of view imaging, a high aspect ratio excitation line (e.g., >1000:1 in length-to-width ratio) may need to be generated. Further, the optical design to relay the scanning from each galvo scanner to the respective focal plane of the objective lens often presents challenges. Specifically, the light intensity at the back focal plane of the objective lens (i.e., the pupil plane) may need to be a diffraction-limited thin line. Further, the phase of the line at the pupil plane may need to be linear. These two requirements can require highly telecentric performance for each relay lens of the system (100) in the laser paths. Shown in FIGS. 2A-2B is an improved scanning lens system (200) that can satisfy these two requirements. The lens system (200) includes two spherical telecentric scan lenses, first lens L1 (202) and second lens L2 (204), and one cylindrical lens (206). The first lens (202) and second lens (204) collectively form a 4f relay, between the galvo scanner and the objective pupil plane. Further, the cylindrical lens (206) is configured to convert the relayed laser beam into a thin line on the pupil plane of the objective lens. The distance between the cylindrical lens (206) and the pupil plane may be, in some embodiments, equal to the focal length of the cylindrical lens (206). By positioning the cylindrical lens (206) as such, the excitation laser beam is focused to a diffraction-limited line on the back focal plane of the objective lens.

Figure 3A:
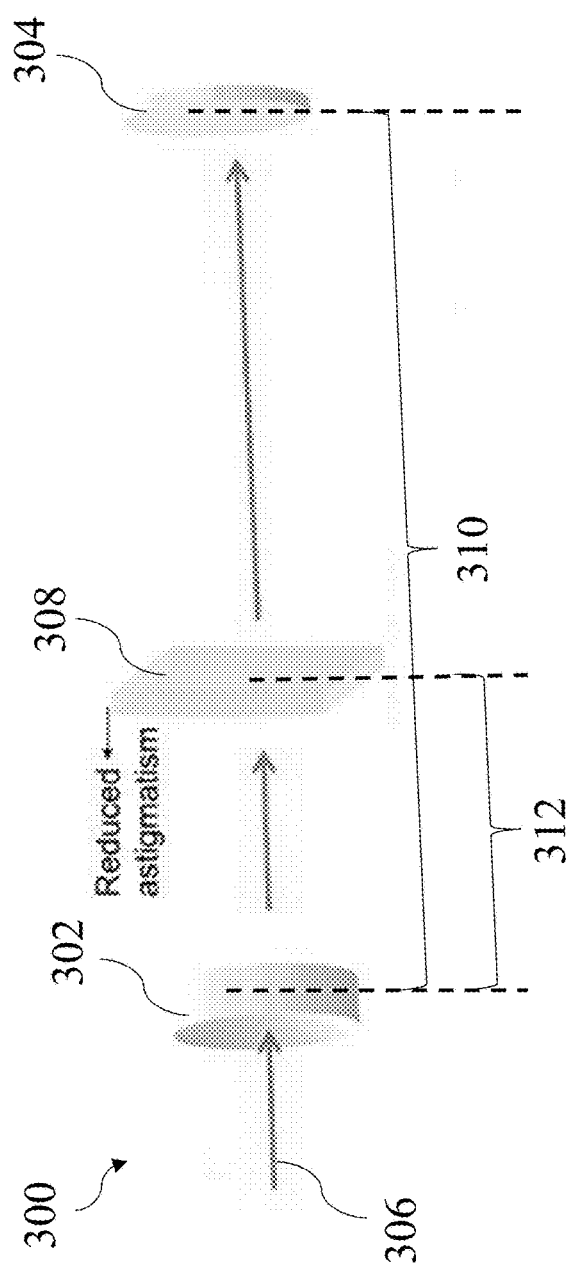
FIG. 3A depicts a schematic of one exemplary dual-axis astigmatism control system, using a single cylindrical lens, showing the spherical lenses separated by a first distance and the cylindrical lens in a first position.
Figure 3B:
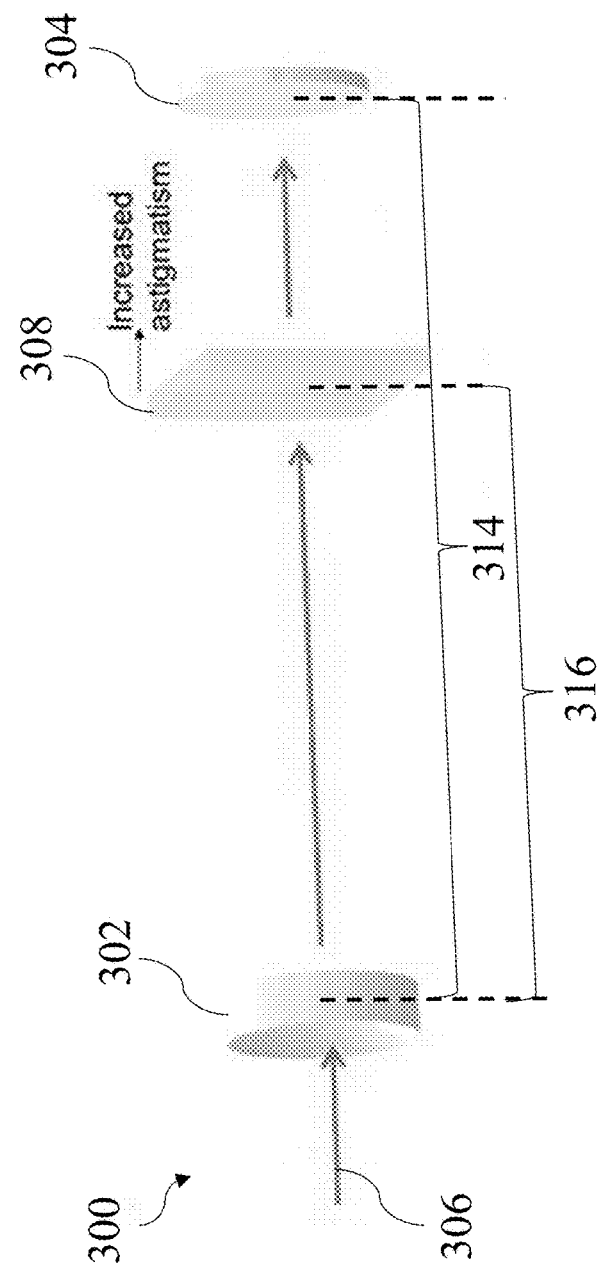
FIG. 3B depicts a schematic of the dual-axis astigmatism control system of FIG. 3A, showing the spherical lenses separated by a second distance and the cylindrical lens in a second position.

For multi-color imaging applications, it can be important to ensure that all colors meet the design aspects noted above. Specifically, that the light intensity at the back focal plane of the objective lens (i.e., the pupil plane) is a diffraction-limited thin line, and the phase of the line at the pupil plane is linear. Although one may choose achromatic components for all lenses involved, it may not perfectly achieve these two design aspects for all laser wavelengths. Accordingly, improved lens systems including features for dual-axis astigmatism control may be configured, which can allow precise tuning of the focus along two orthogonal axes. Such dual-axis astigmatism control may be positioned before the laser beam enters the galvo scanners, as shown in FIG. 1. FIGS. 3A-3B show such an improved lens system (300) that is selectively configurable or adjustable for dual-axis astigmatism control. Lens system (300) includes a concave lens (302) and a convex lens (304). As the laser beam (306) may diverge between the convex and concave lenses (302, 304), a cylindrical lens (308) may also be inserted in between the two lenses (302, 304) along the path of the laser beam (306). FIG. 3A shows a first separation distance (310) between the concave lens (302) and the convex lens (304), and the cylindrical lens (308) positioned at a first position between the concave lens (302) and the convex lens (304) (i.e., a first distance (312) from the concave lens (302) between the concave lens (302) and the convex lens (304)). FIG. 3B shows a second separation distance (314) between the concave lens (302) and the convex lens (304), and the cylindrical lens (308) positioned at a second position between the concave lens (302) and the convex lens (304) (i.e., a second distance (316) from the concave lens (302) between the concave lens (302) and the convex lens (304)). Selectively changing the distance (310, 314) between the concave lens (302) and the convex lens (304) will affect the focusing of both dimensions (e.g., along the x- and y-axes) equally. Additionally, selectively moving the cylindrical lens (308) towards the concave lens (302) (i.e., away from the convex lens (304)) will lead to a smaller laser beam diameter at the cylindrical lens (308), which reduces the effect of the cylindrical lens (308) on one axis (e.g., either the x- and y-axis, depending on the cylindrical lens orientation). Moving the cylindrical lens (308) towards the convex lens (304) (i.e., away from the concave lens (302)) will increase the beam size on the cylindrical lens (308), which increases the effect of the cylindrical lens on one axis (e.g., either the x- and y-axis). The combination of selectively adjusting the separation distance (310, 314) between the two spherical lenses (302, 304), along with selectively adjusting the position of the cylindrical lens (308) in between the two spherical lenses (302, 304), provides the two degrees of freedom to control the focusing of the laser beam (306) in two dimensions. One variation of the design is that the concave lens (302) may be replaced by a convex lens through which the laser beam will first converge and then diverge, achieving a similar function of a convex lens (i.e., making the beam diverging). Another variation is that the cylindrical lens (308) could be positioned between L1 (202) and L2 (204) with its cylindrical axis along the plane of beam scanning, which can also achieve the function of astigmatism control.

Figure 4A:
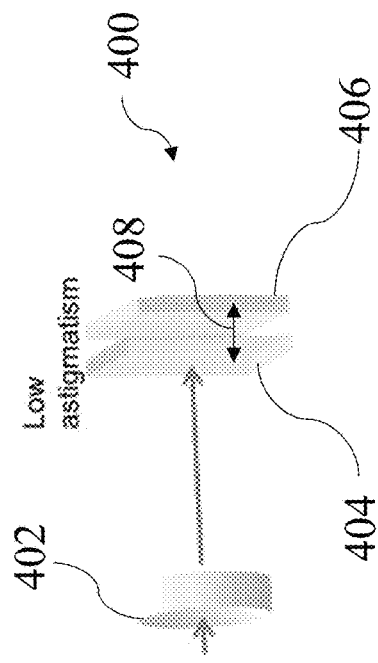
FIG. 4A depicts a schematic of another exemplary dual-axis astigmatism control system, using two cylindrical lenses, showing the relative orientations of the two cylindrical lenses forming a low astigmatism.
Figure 4B:
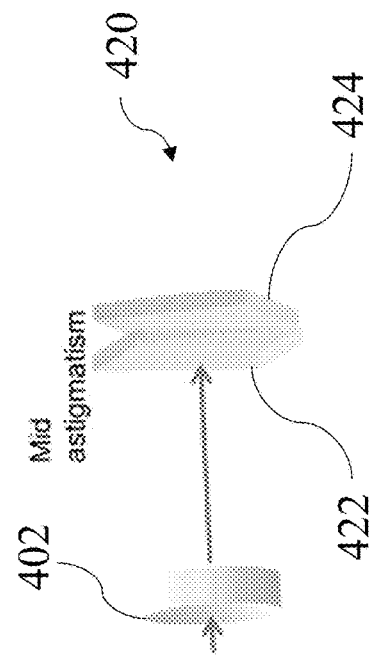
FIG. 4B depicts a schematic of another exemplary dual-axis astigmatism control system, using two cylindrical lenses, showing the relative orientations of the two cylindrical lenses forming a mid astigmatism.
Figure 4C:
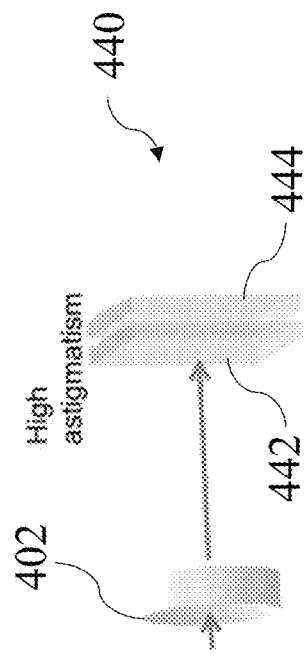
FIG. 4C depicts a schematic of another exemplary dual-axis astigmatism control system, using two cylindrical lenses, showing the relative orientations of the two cylindrical lenses forming a high astigmatism.

As an alternative to portions of system (300) of FIGS. 3A-3B, FIGS. 4A-4C show other concave lens and cylindrical lens systems (400, 420, 440), respectively, that may be utilized to achieve the same functions. As shown in FIG. 4A, system (400) includes a concave lens (402) and two orthogonally oriented convex cylindrical lenses (404, 406). By adjusting the distance between each of the two cylindrical lenses (404, 406) to the concave lens (402), the focus in the two dimensions may be adjusted individually. Further, rotating one of the two cylindrical lenses (404, 406) to a perpendicular orientation (i.e., 90 degrees) relative to the other lens (404 or 406) decreases astigmatism. At angles less than 90 degrees, increased astigmatism may be observed. Accordingly, the smaller the angle, the higher the astigmatism. In another alternatives, as shown in system (420) of FIG. 4B, the relative orientations of cylindrical lenses (422, 424) may be adjusted to positions that are neither parallel nor perpendicular. Finally, in still another alternative as shown in system (440) of FIG. 4C, positioning the two cylindrical lenses (442, 444) in parallel orientation (i.e., zero degrees) relative to the other lens (442 or 444) maximizes astigmatism.

Figure 5:
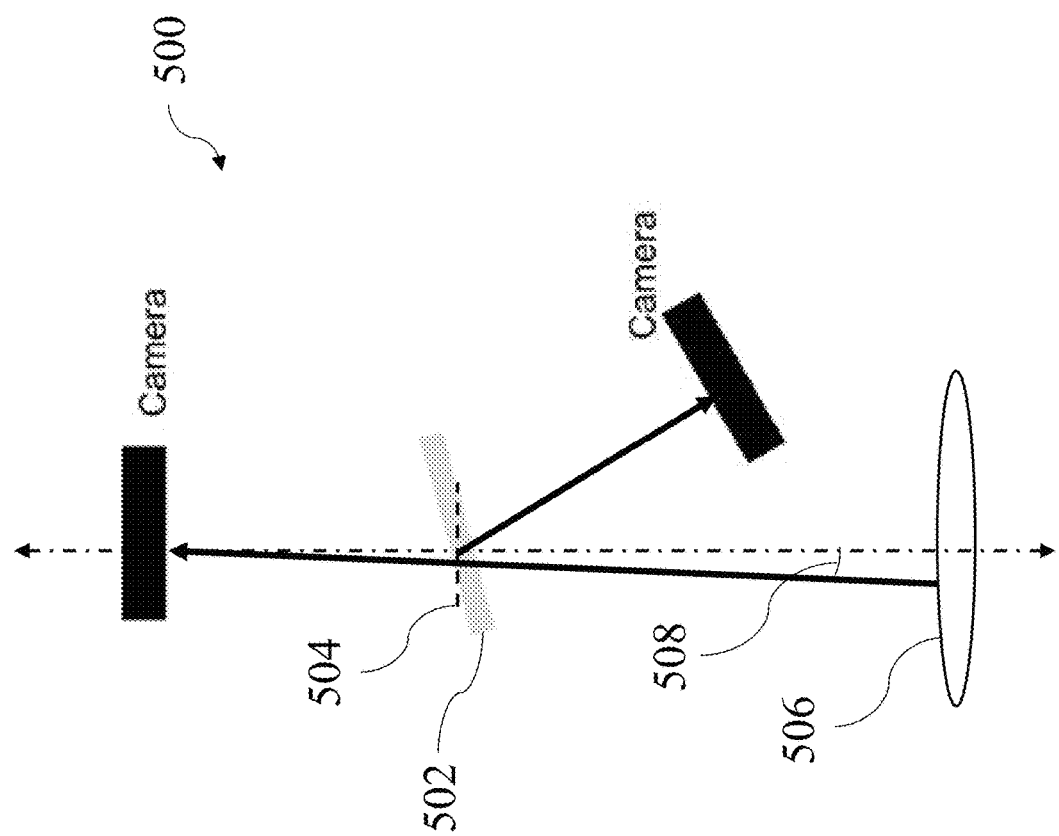
FIG. 5 depicts a schematic of an exemplary dichroic beam splitter configuration.

Shown in FIG. 5 in an exemplary dichroic beam splitter configuration (500), such as for use with system (100), for minimizing the aberration introduced by a dichroic beam splitter (502). First, positioning the dichroic beam splitter (502) near the focal plane (504) of the lens (506) reduces the beam size on the dichroic (502). In some embodiments, the distance between the dochroic beam splitter (502) and the focal plane (504) is less than 20% of the focal length of the lens (506). Second, positioning the dichroic beam splitter (502) such that the reflected beam is introduced at a small incident angle (508) (e.g., less than 25 degrees) is operable to reduce astigmatism caused by the dichroic (502).

Figure 6:
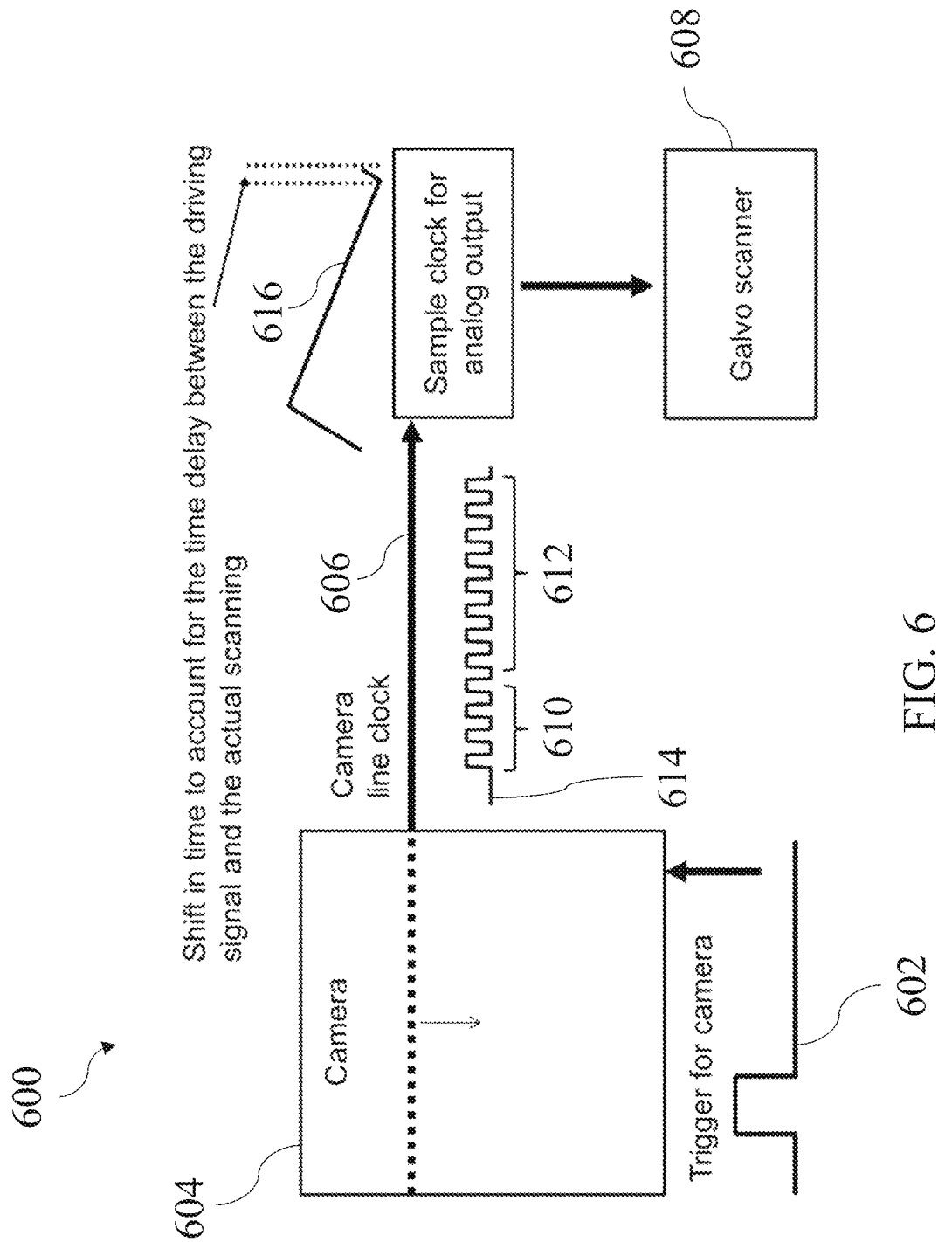
FIG. 6 depicts a block diagram of one exemplary system for synchronizing a camera and a laser scanner.

While existing sCMOS cameras utilize an onboard clock signal, the clock signal frequency of each camera when tracked over a period of time, and/or the clock frequencies of different cameras, are typically different. Moreover, the temporal delay between the camera frame trigger and the actual start of the camera often suffers from temporal jitter. Accordingly, the laser scanner (e.g., the galvo scanner, such as any of galvo scanners of system (100)) may be configured to precisely follow the readout of its corresponding detection camera (604). FIG. 6 shows one exemplary synchronization configuration (600) of the camera (604) and the laser scanner. An external signal (602), which is the camera frame trigger input, may be utilized to trigger the start of each frame of the camera (604). The camera (604) may be configured to output the line clock signal (606) which is often based on its internal onboard clock signal. For the laser scanner (608), the duty cycle may not be 100%. There is typically some portion of time used for the laser scanner to turn around ("fly back time"), a portion of time which is not used for imaging. As such, the camera (604) may be controlled such that it outputs a plurality of pre-synchronization pulses (610) (i.e., line clock pulses before the camera exposure begins), which is used for synchronizing the galvo scanner (608) position before the exposure starts. These pre-synchronization pulses (610) also synchronize the intensity control of the lasers (e.g., the laser illumination may be turned off during the pre-synchronization). Also, a signal gap (614) may be included prior to the pre-synchronization signal (610) to account for any camera clock frequency drift. Overall, the internal line clock of the camera (604) is used as the sample clock for the analog output (606) that drives the scanner (608). As there is commonly a temporal delay between the scanner driving signal (616) and the actual position of the scanner (608), a time shift is therefore included to the scanner control signal. For cameras with reliable clock frequency but without line trigger function, an external clock generator (e.g., a function generator) may be utilized to generate the line trigger signals. For example, the external function generator can be configured to output a series of pulses (e.g., similar to signals 610 and 612) upon receiving the frame start trigger output signal from the camera.

For applications that use a single laser line to excite multiple fluorophores, an alternative strategy may be utilized to handle the temporal jitter between the frame trigger input and the actual start of the camera exposure. The fluorescence emission may be detected by an array of cameras (e.g., the cameras shown in FIG. 1). Emission of different colors is separated by dichroic beam splitters. Typically, one camera will receive the transmitted light while all other cameras receive reflected light from the dichroic beam splitters. The camera that receives transmitted light may be utilized as the master camera, and the galvo scanner may be configured to precisely follow the exposure of the master camera. Due to the trigger jitter, the actual exposed lines on other cameras may be ahead of or behind that of the master camera. To correct for this error, a piezo angle shifter (108) (see, FIG. 1) may be coupled with the dichroic beam splitters (e.g., the two dichroic beam splitters near the cameras), such as by being installed on the optical mount that holds the dichroic beam splitters. The piezo angle shifter may be configured to precisely tilt the dichroic beam splitter orientation at a sub-millisecond time scale. A field-programmable gate array (FPGA) scan generator may then be utilized to track the actual exposure time of each camera in real time at sub microsecond accuracy. Based on the measured timing jitter, the FPGA can be configured to output an analog signal to control the orientation of the dichroic beam splitter such that the emission line is correctly directed to the exposure line on each camera. The sub-millisecond level dichroic angle tilt can take place during the time of the pre-synchronization pulses and therefore does not affect the duty cycle or speed of imaging. Meanwhile, the jitter information and the piezo angle are recorded simultaneously during the imaging. At the end of the measurement, the images are processed from other cameras (i.e., not the master camera). Accordingly, the image is digitally shifted along the line scanning direction by the amount of the actual shift during the measurement to account for the dichroic angle tilt on each frame.

Figure 7:
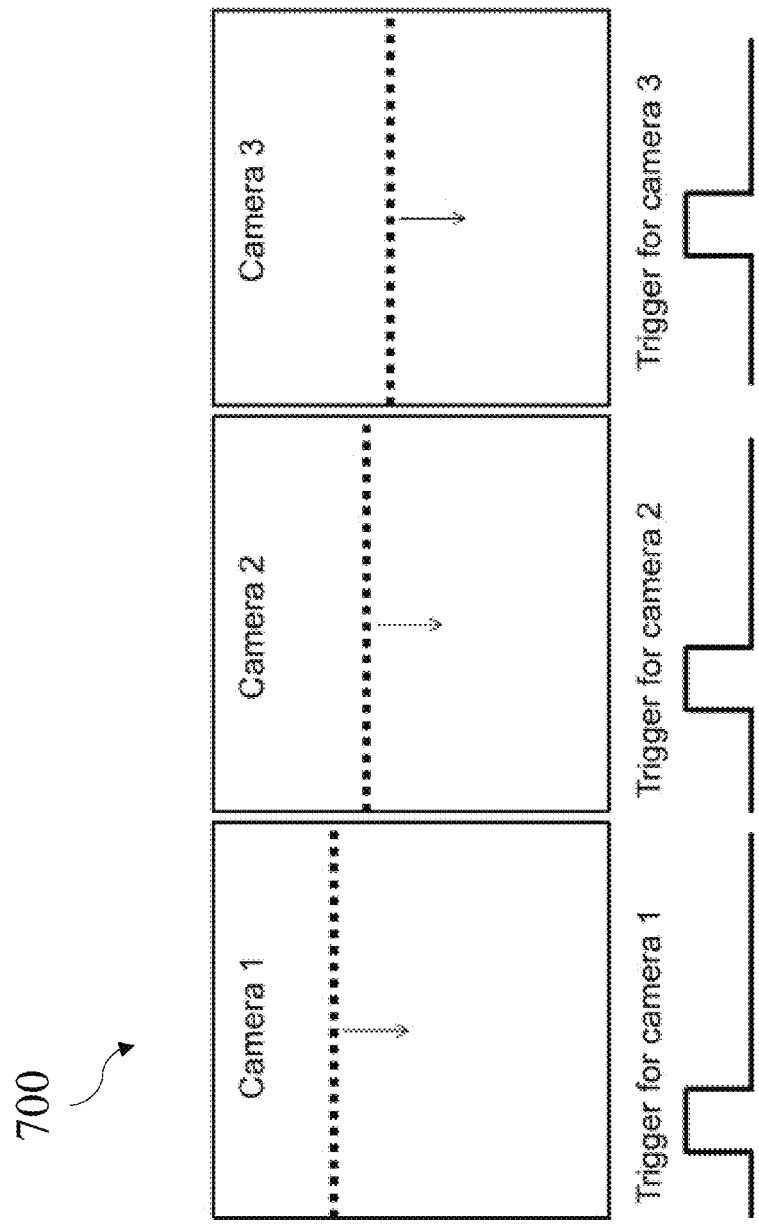
FIG. 7 depicts a block diagram of one exemplary system utilizing delayed scanning of each laser beam color to avoid excitation crosstalk.

For multicolor imaging, laser excitation crosstalk may present complications. Depicted in FIG. 7 is one exemplary system (700) configured for delayed scanning for each color in order to avoid excitation crosstalk. Particularly, as each laser, such as laser beams (102) of system (100), is driven by its own scanner, a temporal delay may be included between the trigger pulses for each separate camera. Accordingly, as the exposure time of each line is very close to the line readout time, such a configuration (i.e., a spatial offset between excitation laser lines on the sample) can effectively reject the undesired excitation light crosstalk.

Figure 8:
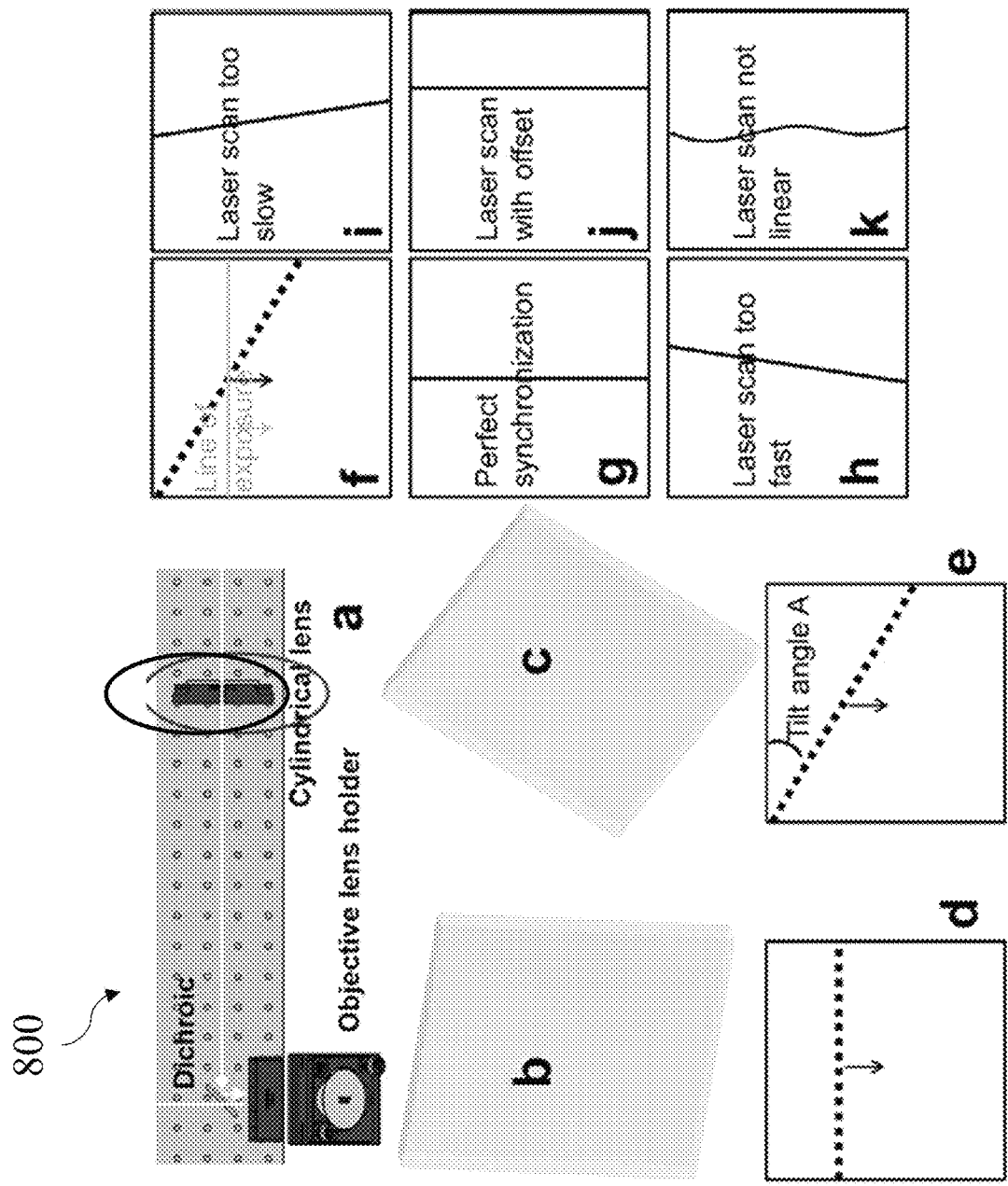
FIG. 8 depicts a block diagram of one exemplary method of calibrating a laser scanner.

FIG. 8 shows one exemplary scanner calibration procedure (800) which may be utilized to calibrate, for example, galvo scanners of system (100), to ensure that the laser scanning is linear and synchronized with the camera line readout. First, the cylindrical lens is rotated by a certain degree (e.g., 45 degrees) and a fluorescence reference slide (or any sample of uniform fluorescence) is positioned under the objective lens. If the scanning is synchronized with the line readout, the image observed on the camera is a straight line in the middle. For scanning too fast or too slow (i.e., improper driving voltage range), the line may appear tilted (see, FIGS. 8H and 8I). A constant offset voltage will shift the line horizontally (see, FIG. 8J). If the scanner motion is not perfectly linear, it will appear as a curve (FIG. 8*k*). To correct these errors, the difference between the observed curve and a perfect vertical line may be used as the error signal, which will be processed and added to the galvo control signal. Typically, after multiple iterations, a straight vertical line can be obtained. Next, the cylindrical lens may be tuned such that the excitation line is horizontal. Finally, a positive or negative offset voltage may be added to the galvo scanner driving voltage until the image intensity is maximized.

Figure 9:
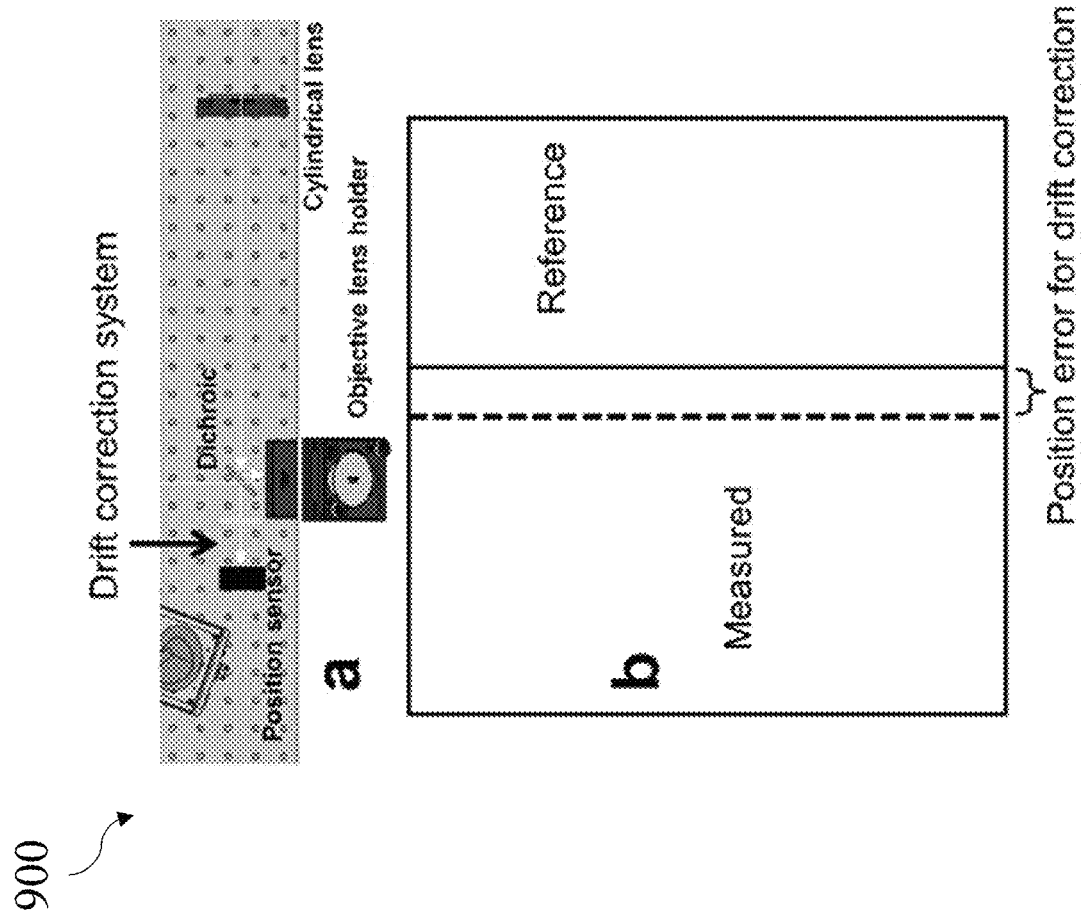
FIG. 9. depicts a block diagram of one exemplary method of correcting laser scanner drift.

Over time, the microscopy system may drift out of calibration. FIG. 9 shown one exemplary drift correction system (900) which may be utilized, for example with system (100), to correct the drift. Specifically, a voltage offset may be added to the scanner control signal. To automatically complete this procedure, the laser beam may be transmitted through the dichroic beam splitter as the reference and a lens may be utilized to focus the laser beam onto a camera. During drift detection, the laser intensity may be controlled such that it is only on within the duration close to a line readout time. The line location on the camera will be compared with a stored perfect line location for reference. The difference is the position drift, which may be processed by a microprocessor and added to the galvo control signal. Depending on the long team stability of the galvo scanner, more complicated correction can also be implemented. For example, the laser can be turned on during two locations to record two lines. The mean position of the two lines represents the position drift of the scanner. Recording the spacing between the positions of the two lines enables the observation of the scanning range variation. Similarly, turning on the lasers at three or even more locations allows more complete diagnosis of the scanning path error due to the scanner variation over long time.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element, or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

We claim:

1. A confocal microscope system, comprising:
   (a) a light source configured to form a light beam;
   (b) a scanning unit in the form of a mechanically driven scanning unit with a controllable scanning trajectory, wherein the scanning unit is configured to direct the light beam through the scanning trajectory; and
   (c) an objective lens defining a pupil plane and a focal plane;
   wherein the light beam is directed from the scanning unit to the objective lens through:
   (i) a pair of relay lenses configured to relay the light beam from an output of the scanning unit onto the focal plane of the objective lens; and
   (ii) a first cylindrical lens defining a focal length, wherein the first cylindrical lens is positioned to receive the light beam from the pair of relay lenses, wherein the distance of the first cylindrical lens from the pupil plane of the objective lens is equal to the focal length of the first cylindrical lens.

2. The confocal microscope system of claim 1, wherein each of the pair of relay lenses are spherical telecentric lenses.

3. The confocal microscope system of claim 1, wherein the pair of relay lenses are configured to collectively form a 4f relay of the light beam between the scanning unit and the objective lens.

4. The confocal microscope system of claim 1, further comprising an astigmatism adjustment module, wherein the astigmatism adjustment module includes a spherical concave lens, a second cylindrical lens, and a spherical convex lens.

5. The confocal microscope system of claim 4, wherein the position of the second cylindrical lens is selectively moveable between the spherical convex lens and the spherical concave lens, wherein movement of the second cylindrical lens in a first direction toward the spherical concave lens is operable to reduce an astigmatism effect on the light beam by the second cylindrical lens, wherein movement of the second cylindrical lens in a second direction toward the convex lens is operable to increase the astigmatism effect on the light beam by the second cylindrical lens.

6. The confocal microscope system of claim 4, wherein the spherical convex lens and the spherical concave lens define a separation distance from each other, wherein the separation distance is selectively adjustable, wherein decreasing the separation distance is operable to increase the divergence of the light beam, wherein increasing the separation distance is operable to increase the convergence of the light beam.

7. The confocal microscope system of claim 1, further comprising an astigmatism adjustment module, wherein the astigmatism adjustment module includes a spherical concave lens, a second cylindrical lens, and a third cylindrical lens.

8. The confocal microscope system of claim 7, wherein the second cylindrical lens defines a first separation distance from the spherical concave lens, wherein the third cylindrical lens defines a second separation distance from the spherical concave lens, wherein the first and second separation distances are each selectively adjustable.

9. The confocal microscope system of claim 7, wherein at least one of the second cylindrical lens or the third cylindrical lens is configured to be selectively axially rotated relative to the other of the second cylindrical lens or the third cylindrical lens.

10. The confocal microscope system of claim 1, further comprising at least one sCMOS camera configured to receive a fluorescence light output transmitted away from the objective lens.

11. The confocal microscope system of claim 10, wherein the at least one sCMOS camera is operable to output a line clock signal, wherein the scanning unit is configured to synchronize the controllable scanning trajectory with the line clock signal.

12. The confocal microscope system of claim 10, further comprising a dichroic beam splitter configured to receive the fluorescence light output and separate the fluorescence light output into a plurality of light bandwidths, wherein at least one of the plurality of light bandwidths is directed toward at least one sCMOS camera, wherein the dichroic beam splitter is positioned a distance from a focal plane defined by the at least one sCMOS camera, wherein the distance is less than 20% of a focal length defined by the at least one sCMOS camera.

13. The confocal microscope system of claim 10, further comprising a dichroic beam splitter configured to receive the fluorescence light output and separate the fluorescence light output into a plurality of light bandwidths, wherein the fluorescent light output is introduced to a surface of the dichroic beam splitter at an incident angle of less than 25 degrees.

14. The confocal microscope system of claim 13, further comprising a piezo angle shifter coupled with the dichroic beam splitter, wherein the piezo angle shifter is configured to selectively adjust the dichroic beam splitter orientation.

15. The confocal microscope system of claim 1, further comprising:
   (a) a plurality of detectors each configured to receive a fluorescence light output transmitted away from the objective lens, wherein each of the plurality of detectors is configured to receive a different bandwidth of the fluorescence light output; and
   (b) a plurality of scanning units each having controllable scanning trajectories, wherein each scanning unit is associated with one of the plurality of detectors and is configured to direct a respective light beam through the scanning trajectory and to the associated detector;
   wherein each of the plurality of detectors is operable to output a respective line clock signal, wherein each respective scanning unit is configured to synchronize the controllable scanning trajectory with the respective line clock signal; and
   wherein each respective line clock signal includes a temporal delay relative to the other respective line clock signals.

16. A confocal microscope system, comprising:
   (a) a light source configured to form a light beam;
   (b) a scanning unit in the form of a mechanically driven scanning unit with a controllable scanning trajectory, wherein the scanning unit is configured to direct the light beam through the scanning trajectory;
   (c) an objective lens defining a pupil plane and a focal plane; and (d) an astigmatism adjustment module operable to affect the light beam between the light source and the scanning unit, wherein the astigmatism adjustment module includes a plurality of lenses selectively movable relative to each other to adjust astigmatism of the light beam.

17. The confocal microscope system of claim 16, wherein the astigmatism adjustment module includes a spherical concave lens, a first cylindrical lens, and a spherical convex lens, wherein the first cylindrical lens is positioned between the spherical concave lens and the spherical convex lens, wherein the first cylindrical lens is selectively movable between the spherical concave lens and the spherical convex lens to adjust astigmatism of the light beam.

18. The confocal microscope system of claim 16, wherein the astigmatism adjustment module includes a spherical concave lens, a first cylindrical lens, and a second cylindrical lens, wherein the first cylindrical lens defines a first separation distance from the spherical concave lens, wherein the second cylindrical lens defines a second separation distance from the spherical concave lens, wherein the first and second separation distances are each selectively adjustable.

19. The confocal microscope system of claim 16, wherein the light beam is directed from the scanning unit to the objective lens through:

(a) a pair of relay lenses configured to relay the light beam from an output of the scanning unit onto the focal plane of the objective lens; and
(b) a first cylindrical lens defining a focal length, wherein the first cylindrical lens is positioned to receive the light beam from the pair of relay lenses, wherein the distance of the first cylindrical lens from the pupil plane of the objective lens is equal to the focal length of the first cylindrical lens.

20. A confocal microscope system, comprising:
(a) a light source configured to form a light beam;
(b) a scanning unit in the form of a mechanically driven scanning unit with a controllable scanning trajectory, wherein the scanning unit is configured to direct the light beam through the scanning trajectory;
(c) an objective lens defining a pupil plane and a focal plane; and
(d) at least one sCMOS camera configured to receive a fluorescence light output transmitted away from the objective lens,
wherein the at least one sCMOS camera is operable to output a line clock signal, wherein the scanning unit is configured to synchronize the controllable scanning trajectory with the line clock signal.

\* \* \* \* \*